Dec. 21, 1965 D. J. COCHRAN 3,225,218
SERVO ERROR DETECTOR
Filed June 26, 1963
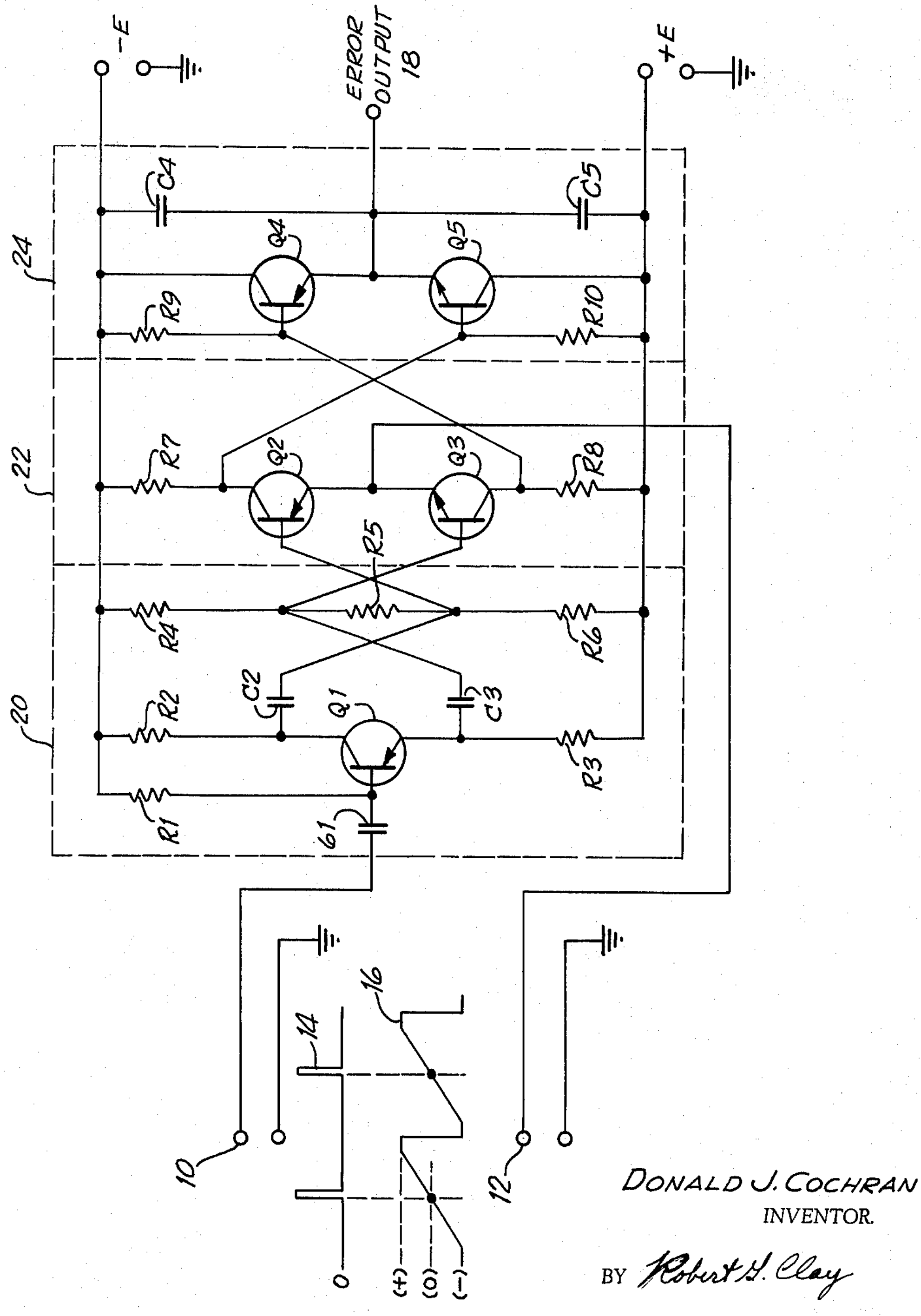
DONALD J. COCHRAN
INVENTOR.
BY Robert G. Clay
ATTORNEY

United States Patent Office 3,225,218
Patented Dec. 21, 1965

3,225,218
SERVO ERROR DETECTOR

Donald J. Cochran, Pacifica, Calif., assignor to Ampex Corporation, Redwood City, Calif., a corporation of California Filed June 26, 1963, Ser. No. 290,825
3 Claims. (Cl. 307—88.5)

This invention relates generally to servo systems and more particularly to a servo error detector suitable for use in video recorder motor control apparatus.

Video recording systems of the type in which a drum, carrying one or more magnetic heads on the circumference thereof, is caused to rotate with respect to a moving magnetic tape are well known. In such systems, it is desirable to synchronize the drum speed with the video signal recorded on the tape and the tape movement with the drum speed. Consequently, both a drum motor servo loop and a capstan motor servo loop are generally provided.

In these and other servo loops, an error output signal substantially proportional to the error (e.g. in position or speed) of the controlled device, such as a motor, is developed in a detector and fed back to the controlled device to cause an effect tending to correct the error. In order to develop the error output signal, means must be provided for manifesting both the present condition of the controlled device and the desired condition. These manifestations are often respectively referred to as the controlled variable signal and the reference signal.

As with other electrical equipment, a good servo loop error detector should be relatively simple in construction and consequently inexpensive and reliable. Presently available detectors suitable for use in tape system motor control servo loops usually leave something to be desired inasmuch as they are often too expensive and do not provide sufficiently high voltage error output signals without using costly amplifiers.

In view of the above, it is an object of the present invention to provide an improved servo loop error detector which is relatively simple in construction and which can be manufactured and maintained at a relatively low cost.

It is an additional object of the present invention to provide an improved servo loop error detector which is capable of providing relatively high voltage error output signals.

In order to control the drum motor in a video recording apparatus, it has been suggested that means be provided for developing a ramp voltage signal, linearly varying about a reference potential level, such as zero, for each vertical sync pulse of the video signal. By utilizing the ramp voltage signal as the controlled variable signal and sampling the polarity and amplitude of the ramp voltage signal at times determined by the occurrence of a signal indicative of the position of the head drum constituting the reference signal, an error output signal representing the position or phase error of the drum motor can be obtained.

It is accordingly a further object of this invention to provide a servo loop error detector which can be utilized to provide an error output voltage proportional to the polarity and amplitude of a ramp voltage signal sampled at times determined by the occurrence of pulses which can, for example, be indicative of the position of a head drum.

Briefly, the invention herein is directed to a servo loop error detector for sampling the polarity and amplitude of a ramp voltage signal and developing an error signal at the detector output. The detector comprises a circuit which can be considered as including three sections, namely an input or phase inverter section provided with a reference input terminal, a gate section provided with a controlled variable input terminal, and an output section provided with an error output terminal. A ramp voltage signal is applied to the controlled variable input terminal and position pulses indicative of the head drum position are applied to the reference input terminal. The gate section functions to isolate the controlled variable input terminal from the output section except when a position pulse is applied to the phase inverter section. In response to the application of a position pulse to the reference input terminal, the potential of the error output terminal is made equal to the amplitude of the ramp voltage. The error output potential is maintained after the position pulse terminates by capacitor means in the output section.

The novel features that are considered characteristic of this invention are set forth with particularity in the appended claims. The invention itself both as to its organization and method of operation, as well as additional objects and advantages thereof, will best be understood from the following description when read in connection with the accompanying drawing, in which the sole figure is a circuit diagram of a servo loop error dtector in accordance with the present invention.

The detector includes a reference input terminal 10 and a controlled variable input terminal 12. Regularly spaced rectangular sampling pulses 14 are applied to the reference input terminal 10 by a source (not shown). When used in a video recorder, the pulses 14 can be derived from a tachometer associated with the head carrying drum (not shown) to indicate the position of the drum.

A ramp voltage signal 16 is applied to the controlled variable input terminal 12 by a source (not shown). In a video recorder, the ramp signal 16 can be derived from a generator triggered by the vertical synchronizing pulses of the video signal. In order to synchronize the position of the drum with the video signal synchronizing pulses, the polarity and amplitude of the ramp signal 16 can be sampled at times determined by the occurrence of the position pulses 14. If the drum is properly synchronized with the video signal, the amplitude of the ramp signal 16 will be zero when it is sampled. On the other hand, if the drum is not properly synchronized, the sampled amplitude of the ramp signal will be either positive or negative by varying amounts. The sampled amplitude and polarity of the ramp signal is established at the error output terminal 18.

The detector circuit can be considered as including three sections, namely an input or phase inverter section 20, a gate section 22, and an output section 24. It will be noted that the reference input terminal 10 is connected to the phase inverter section 20, the controlled variable input terminal 12 is connected to the gate section 22 and the error output terminal 18 is connected to the output section 24.

A capacitor C1 couples the reference input terminal 10 to the base of a PNP transistor Q1. The base of transistor Q1 is additionally coupled through resistor R1 to a source of negative potential (—E). The collector of transistor Q1 is coupled through resistor R2 to the source of negative potential (—E) and the emitter of transistor Q1 is connected through resistor R3 to a source of positive potential (+E).

A series resistance branch including resistors R4, R5, and R6 is connected between the source of negative potential (—E) and the source of positive potential (+E). A capacitor C2 connects the collector of transistor Q1 to the junction between resistors R5 and R6 and a capacitor C3 connects the emitter of transistor Q1 to the junction between resistors R4 and R5.

The junction between resistors R5 and R6 is connected to the base of a PNP transistor Q2 in the gate section 22 and the junction between resistors R4 and R5 is connected to the base of an NPN transistor Q3 in the gate section 22. A resistor R7 connects the collector of transistor Q2 to the source of negative potential (—E) and a resistor R8 connects the collector of transistor Q3 to the source of positive potential (+E). The emitters of transistors Q2 and Q3 are connected to each other and to the controlled variable input terminal 12.

The collector of transistor Q3 is connected to the base of PNP transistor Q4 in the output section 24 and the collector of transistor Q2 is connected to the base of an NPN transistor Q5 also in the output section 24. Resistor R9 connects the base of transistor Q4 to the source of negative potential (—E) while the resistor R10 connects the base of transistor Q5 to the source of positive potential (+E). The emitters of transistors Q4 and Q5 are connected together and to the error output terminal 18. The collectors of transistors Q4 and Q5 are respectively connected to the sources of negative and positive potential (—E, +E).

A capacitor C4 is connected across the emitter and collector of transistor Q4 and a capacitor C5 is similarly connected across the emitter and collector of transistor Q5.

Before proceeding with an explanation of the operation of the illustrated detector circuit, the following list of exemplary values for the various components is offered to facilitate an understanding of the operation to be discussed. It is specifically pointed out however that components having considerably different values could be arranged in accordance with the teachings of the invention:

| | |
|---|---|
| R1—8.2K ohms | R9—22K ohms |
| R2—470 ohms | R10—22K ohms |
| R3—470 ohms | C1—.02 microfarad |
| R4—15K ohms | C2—.05 microfarad |
| R5—47K ohms | C3—.05 microfarad |
| R6—15K ohms | C4—3 microfarads |
| R7—4.7K ohms | C5—3 microfarads |
| R8—4.7K ohms | E=12 volts |

Let it be initially assumed that the detector circuit is in a quiescent state so that no position pulse 14 is being applied to reference input terminal 10 and that the base of transistor Q1 is at ground potential. The ramp voltage signal 16 is of course continually applied to the controlled variable input terminal 12.

The application of ground potential to the base of transistor Q1 causes the transistor to conduct in saturation. On the other hand, transistors Q2, Q3, Q4, and Q5 are all off-biased. Capacitors C4 and C5 are accordingly connected in series between the negative and positive voltage sources (—E, +E) and consequently the error output terminal 18 resides approximately at ground potential.

Now assume that a position pulse 14 is applied to reference input terminal 10. Capacitor C1 and resistor R1 differentiate the rectangular position pulse to define a sharp spike which virtually instantaneously off-biases transistor Q1. As a consequence, the collector of transistor Q1 falls from approximately ground potential to —12 volts and the potential on the emitter of transistor Q1 increases from approximately ground potential to +12 volts. Inasmuch as the voltage across a capacitor cannot change instantaneously, the voltage changes at the left terminals of capacitors C2 and C3 are coupled to the junctions between resistors R5 and R6 and resistors R4 and R6, respectively. Consequently, transistors Q2 and Q3 are both conditioned for conduction which is dependent upon the potential applied to their respective emitters. Under normal or synchronized operating conditions, the ramp voltage signal 16 applied to terminal 12 has a zero potential coincident with the occurrence of position pulses 14 and the transistors Q2 and Q3 therefore remain in a quiescent or cut-off state because their emitter and collector potentials are substantially equal. When transistors Q2 and Q3 are cut-off, transistors Q4 and Q5 are also cut-off.

When operating conditions are not synchronized however, the occurrence of position pulse 14 will not be coincident with the zero crossover point of the ramp voltage signal 16 and either a positive or negative potential will be applied to the emitters of transistors Q2 and Q3. For example, assume that the ramp voltage signal 16 has a positive potential when the position pulse 14 occurs. In this event, the transistor Q2 will be forward biased. If the ramp voltage signal 16 were negative when sampled (e.g. as shown by dotted lines in the figure), transistor Q3 would be forward biased rather than transistor Q2.

In any event, regardless of which of the transistors Q2 or Q3 is forward biased, the potential established at the emitters thereof by the ramp input signal is reflected at the collector of the forward biased transistor and applied to the base of either transistor Q4 or Q5. Either transistor Q4 or Q5 is thereby forward biased virtually instantaeously. Inasmuch as transistors Q4 and Q5 are arranged in what may be considered emitter-follower configurations, the junction between the emitters thereof will assume a potential substantially equal to that applied to the base of the forward biased transistor. Of course, this potential is applied to the error output terminal 18.

The series capacitive circuit including capacitors C4 and C5 quickly charges through the extremely low resistance emitter-collector paths of transistors Q4 and Q5 and subsequently retains the potential established at the junction therebetween once the position pulse 14 terminates returning the detector to its quiescent state.

From the foregoing, it should be appreciated that an improved detector has been provided herein which can be utilized in any servo error loop but which is particularly adapted for use in a video recorder servo error loop for controlling a drum motor. Although it has been suggested that the sampling pulses 14 are indicative of the position of a head drum and the ramp voltage signal 16 is derived from video synchronizing pulses, the circuit can be efficiently employed in an opposite manner. That is, pulses 14 can in fact be video synchronizing pulses and the ramp voltage signal 16 can be derived from a generator triggered by pulses developed by a tachometer arrangement coupled to the drum.

It is further to be understood that although the circuit has been illustrated as very efficiently and inexpensively sampling a ramp voltage signal and setting the sampled voltage at the circuit output terminal, it can in addition satisfactorily operate to similarly sample variable signals other than ramp voltage signals.

What is claimed is:

1. A servo loop error detector comprising a reference input terminal; a controlled variable input terminal; an error output terminal; a source of positive reference potential; a source of negative reference potential; a first transistor; means connecting the emitter and collector of said first transistor to said positive and negative sources of reference potential, respectively; means coupling said reference input terminal to the base of said first transistor; second and third transistors of opposite impurity types; means connecting the collectors of said second and third transistors to said negative and positive sources of reference potential, respectively; means connecting the emitters of said second and third transistors to said controlled variable input terminal; means respectively connecting the collector and emitter of said first transistor to the bases of said second and third transistors for forward biasing said second and third transistors in response to said first transistor being off-biased and for off-biasing said second and third transistors in response to said first transistor being forward biased; fourth and fifth transistors of opposite impurity types; means respectively connecting the collectors of said fourth and fifth transistors to said negative and positive sources of reference potential; means connecting the emitters of said fourth and fifth transistors to said error output terminal; means respectively connecting the collectors of said second and third transistors to the bases of said fifth and fourth transistors; means connecting a first capacitor across the emitter and collector of said fourth transistor; and means connecting a second capacitor across the emitter and collector of said fifth transistor.

2. A servo loop error detector comprising a phase inverter for receiving sampling pulses and responsively generating sets of gate pulses of mutually opposite polarity, first and second transistors of opposite impurity types, positive and negative sources of reference potential respectively coupled to the collectors of said first and second transistors, a terminal for receiving a controlled variable signal commonly connected to the emitters of said first and second transistors, means coupling said inverter to the bases of said first and second transistors for coupling said sets of gate pulses in forward biasing relation thereto whereby said first and second transistors are respectively rendered conducting in response to positive and negative portions of said controlled variable signal in coincidence with said sampling pulses, a pair of capacitors connected in series between said positive and negative sources of reference potential, an error output terminal connected to the junction between said capacitors, and means coupled between the collectors of said first and second transistors and said capacitors for applying the potential at said collector of said first transistor across one of said capacitors during conduction of said first transistor and applying the potential at said collector of said second transistor across the other of said capacitors during conduction of said second transistor.

3. A servo loop error detector according to claim 2, further defined by said means coupled between the collectors of said first and second transistors and said capacitors comprising a third transistor of opposite impurity type to said first transistor and a fourth transistor of opposite impurity type to said second transistor, means coupling the collector of said first and second transistors to the bases of said third and fourth transistors respectively, means connecting the opposite sides of one of said capacitors to the collector and emitter of said third transistor, and means connecting the opposite sides of the other of said capacitors to the collector and emitter of said fourth transistor.

References Cited by the Examiner

UNITED STATES PATENTS

| | | | |
|---|---|---|---|
| 2,840,707 | 6/1958 | Johnson | 328—151 |
| 3,031,588 | 4/1962 | Hilsenrath | 307—88.5 |

ARTHUR GAUSS, *Primary Examiner.*

M. LEE, *Assistant Examiner.*